United States Patent [19]

Schettler

[11] Patent Number: 5,673,189
[45] Date of Patent: Sep. 30, 1997

[54] DEVICE FOR INCREASING THE POWER YIELD OF THE FUNDAMENTAL COMPONENT OF A SELF-COMMUTATED POWER INVERTER

[75] Inventor: Frank Schettler, Erlangen, Germany

[73] Assignee: Siemens Aktiengesellschaft, München, Germany

[21] Appl. No.: 512,595

[22] Filed: Aug. 8, 1995

[30] Foreign Application Priority Data

Oct. 6, 1994 [DE] Germany .............. 9416048 U

[51] Int. Cl.$^6$ .................................................. H02M 7/521
[52] U.S. Cl. ........................ 363/137; 323/207; 363/60
[58] Field of Search ................... 363/137, 60, 97, 363/61, 98, 37, 35, 39; 323/207

[56] References Cited

U.S. PATENT DOCUMENTS

| | | | |
|---|---|---|---|
| 5,051,683 | 9/1991 | Hirose et la. | 323/207 |
| 5,218,283 | 6/1993 | Wills et la. | 318/748 |
| 5,239,454 | 8/1993 | Dhyanchand . | |

FOREIGN PATENT DOCUMENTS

| | | |
|---|---|---|
| 31 05 094 | 1/1982 | Germany . |
| 38 31 128 | 1/1990 | Germany . |
| 38 31 126 | 3/1990 | Germany . |
| 43 12 019 | 11/1993 | Germany . |

OTHER PUBLICATIONS

Shosuke, M. et al.: *Development of a Large Static VAR Generator Using Self-Commutated Inverters For Improving Power System Stability;* IEEE Transactions On Power Systems, vol. 8, No. 1, Feb. 1993, pp. 371–377.
PESC '92 Record, 23rd Annual IEEE Power Electronics Specialists Conference, Toledo, Spain, 1992, pp. 521–529.
ISIE'93—Budapest, IEEE International Symposium on Industrial Electronics, Conference Proceedings, pp. 38–43: *Multilevel Converters for High Power AC Drives: A Review,* Budapest, Hungary, 1–3 Jun. 1993.

Primary Examiner—Peter S. Wong
Assistant Examiner—Rajnikant B. Patel
Attorney, Agent, or Firm—Kenyon & Kenyon

[57] ABSTRACT

A device for increasing the fundamental power yield of a self-commutated inverter with a capacitive storage device. The device is connected to the outputs of a self-commutated inverter, providing at least one single-phase cascade per R, S and T phase. Each single-phase cascade includes a capacitive storage device and a switching device with which the capacitive storage device can be switched into phase and out of phase with respect to the phase with which the cascade is associated.

18 Claims, 6 Drawing Sheets

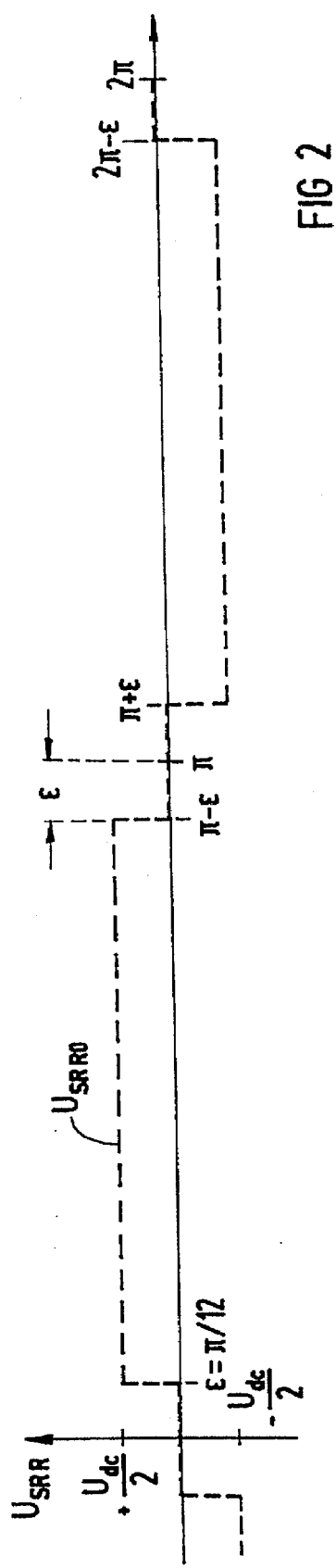
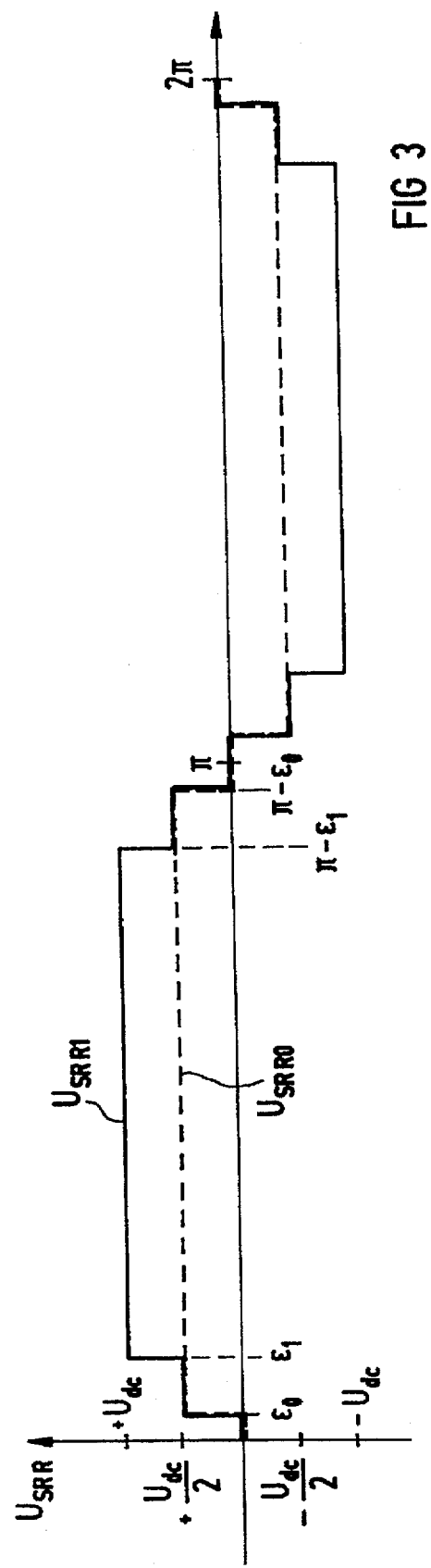

SWITCHING STATE TABLE

| S1 | S2 | $U_{SR\,Rn} - U_{SR\,Rn-2}$ |
|---|---|---|
| + | + | 0 |
| + | 0 | $+1/2 U_{dc}$ |
| + | − | $+U_{dc}$ |
| 0 | − | $+1/2 U_{dc}$ |
| − | − | 0 |
| − | 0 | $-1/2 U_{dc}$ |
| − | + | $-U_{dc}$ |
| 0 | + | $-1/2 U_{dc}$ |
| + | + | 0 |
| + | 0 | $+1/2 U_{dc}$ |
| . | . | . |
| . | . | . |
| . | . | . |

DEVICE FOR INCREASING THE POWER YIELD OF THE FUNDAMENTAL COMPONENT OF A SELF-COMMUTATED POWER INVERTER

BACKGROUND OF THE INVENTION

The present invention concerns a device for increasing the power yield of the fundamental component of a self-commutated power inverter with a capacitive storage unit.

For reactive power compensation equipment having a self-commutated power inverter with a capacitive storage unit, the terms "static var generator (SVG)," "advanced static var compensator (ASVC)" and "static condenser (STATCON)" are conventionally used. Fundamental reactive power can be provided or dissipated by means of the self-commutated power inverter that converts the d.c. voltage of a capacitive energy storage unit (capacitor) to a.c. current and is connected via a transformer (reactance) to a network node.

A reactive power compensation device is known from the article "A Comparison of Different Circuit Configurations for an Advanced Static Vat Compensator (ASVC)" printed in "PESC '92 Record; 23rd Annual IEEE Power Electronics Specialists Conference Toledo, Spain," 1992, pages 521–529. This article describes and compares several ASVC circuits. The basic circuit of an ASVC consists of a three-phase inverter with a capacitive storage unit, where the inverter is connected to a network node by way of a transformer.

Either a two-point inverter or a three-point inverter is used as the power inverter. These inverters are controlled by means of fundamental frequency modulation (full-block control), where the fundamental reactant that can be achieved is greater with a three-point inverter than with a two-point inverter.

In addition, the 5th and 7th harmonics are minimal when the angle $\beta$ (angle range for the zero potential) is equal to $\pi/12$. ASVC circuits consisting of two two-point or three-point inverters and using different transformers are also described in this article. The pulse number and the distortion of the phase current are to be reduced by means of these circuits. A greater power of the fundamental wave is obtained by increasing the pulse number.

Table 3 and FIGS. 10 to 16 of this article indicate which of the circuit variants of an ASVC shown in FIG. 8 of this article is optimal with regard to the harmonic components. A comparison shows that the circuit variants n and o have the highest fundamental yield. However, this is achieved only when two three-point inverters are each used with a capacitive storage unit and a transformer with two series-connected primary windings and two secondary windings in different winding circuits.

In the article "Development of a Large Static Var Generator Using Self-Commutated Inverters for Improving Power System Stability," printed in "IEEE Transactions on Power Systems," vol. 8, no. 1, Feb. 1993, pages 371–377, a "static var generator (SVG)" for 80 MVA is described. This 80 MVA SVG consists of eight inverters whose bridge leges each consist of six series-connected gate turn-off thyristors (GTO), each of which generates the same output voltage but each is shifted electrically by 7.5° with respect to each other. A special transformer with eight primary windings and eight secondary windings is needed for this phase angle. This special transformer is connected by means of a main transformer to a high-voltage network. This transformer design requires part of the available reactance. This yields a pulse number of 48 and thus an improvement in the fundamental power. An improvement in fundamental power is achieved with this reactive power compensation device (SVG) only with the help of several inverters and a special transformer, but the fundamental yield per switching element of the inverter is not increased.

Another known way of improving the fundamental yield (power per switching element) consists of using a multi-point inverter. The article "A High-Voltage Large-Capacity Dynamic Var Compensator Using Multilevel Voltage Source Inverter," printed in "PESC '92 Record, 23rd Annual IEEE Power Electronics Specialists Conference Toledo, Spain," 1992, pages 538–545, describes a five-point inverter of an SVC in detail. By using a multi-point inverter, the fundamental yield at the a.c. voltage generated by the inverter is improved.

Another known improvement can be achieved when two five-point inverters are used with a transformer according to the first article cited above.

The present invention is directed towards increasing the fundamental power yield of a self-commutated inverter, especially a reactive-power compensation device, using simple means.

SUMMARY OF THE INVENTION

The present invention achieves this objective by providing the outputs of a self-commutated inverter with a device that has at least one single-phase cascade per R, S, and T phase. Each single-phased cascade has a capacitive storage device and a switching device with which the capacitive storage device can be switched into phase (R,S,T) or out of phase as desired.

According to the present invention, at least one additional capacitive storage device can be switched per phase into the current path of a phase, and thus a stepwise increase in the line-midpoint voltage of the inverter can be achieved. Through a suitable choice of the time (angle) of the connection, the production of higher harmonics can be minimized. This improves utilization of the inverter, increasing the power yield without using a special transformer and other inverters.

Embodiments with several cascades per phase allow several capacitive storage devices to be wired into the current path of a phase, so the line-midpoint voltage has several voltage levels. Depending on the number of levels, in other words, the number of cascades in the embodiment and the times when these cascades are connected, the fundamental yield of the line-midpoint voltage is increased and the distortion of the phase current is decreased.

The present invention can be used with a two-point, three-point or multi-point inverter. The design of the individual cascades of the present invention does not depend on the point number of the inverter. In other words, a cascade may be used regardless of the type of inverter used.

In an advantageous embodiment of the present invention, two cascades per phase are combined in one structural unit. This embodiment saves one capacitive storage device per phase, because the switching elements of the two cascades rely on a capacitive storage device.

At least one capacitor is used as the capacitive storage device. The design of the capacitive storage device does not depend on the type of inverter—in other words, the same cascade can be used with a two-point inverter, a three-point inverter or a five-point inverter.

BRIEF DESCRIPTION OF THE DRAWINGS

FIG. 2 shows the line-midpoint voltage of a three-point inverter without the device according to this invention, plotted as a function of the angle.

FIG. 3 shows the line-midpoint voltage of a three-point inverter with the device according to this invention, plotted as a function of the angle.

DETAILED DESCRIPTION

Figure 1:
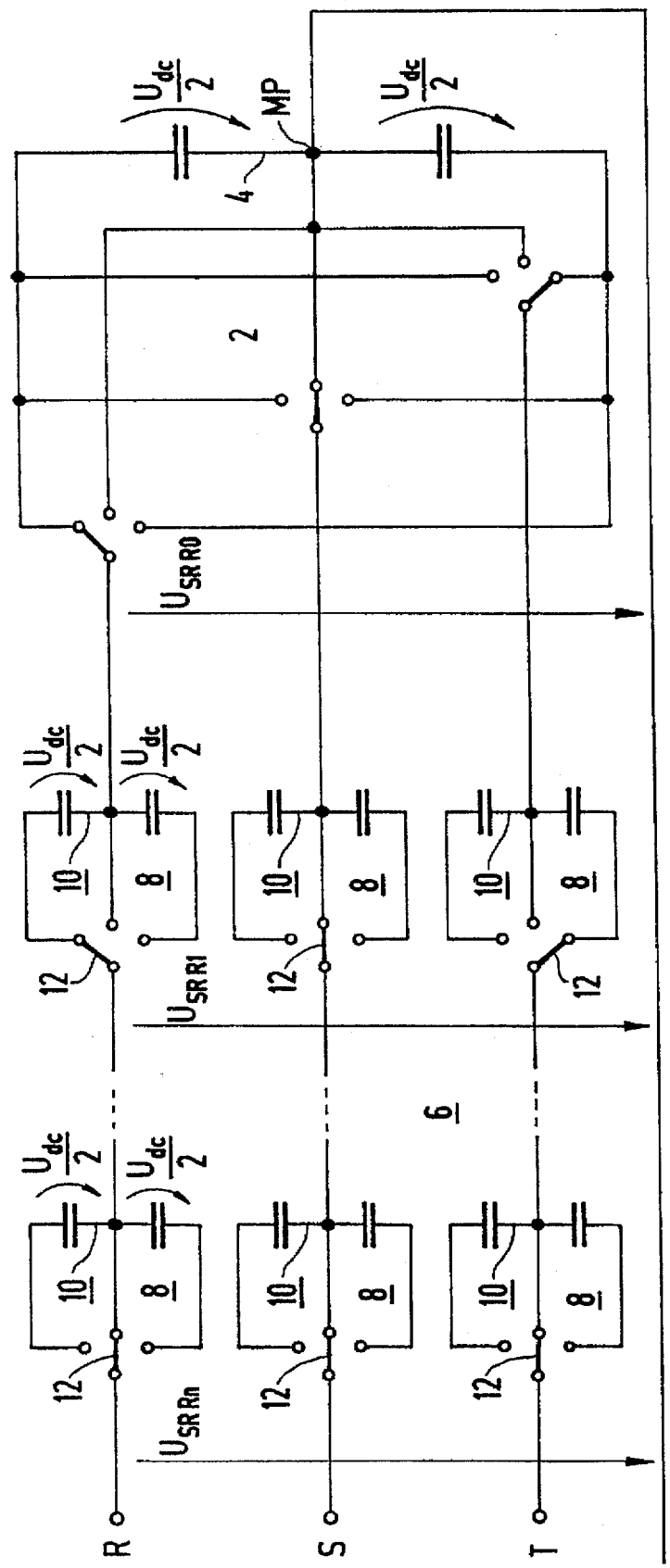
FIG. 1 shows a block schematic of a three-point inverter with an upstream device according to this invention.

FIG. 1 shows a block schematic diagram of a self-commutated inverter 2 with a capacitive storage device 4, such as a reactive power compensation unit with a device 6 connected upstream in accordance with the present invention. The reactive power compensation device, for example, also has a transformer with which the self-commutated inverter 2 is connected to a network node. The transformer and the power supply network are not shown in greater detail in order to simplify the diagram. As mentioned previously, fundamental reactance is supplied or dissipated by means of the self-commutated inverter 2 that converts the d.c. voltage of the capacitive storage device 4 to an a.c. voltage and is connected to a network node by way of a transformer (not shown). Such a reactive-power compensation device is referred to as an "advanced static var compensator (ASVC)" or a "static var generator (SVG)" according to the publications cited earlier. The embodiment of the self-commutated inverter 2 discussed herein is a three-point inverter. According to the article "A Comparison of Different Circuit Configurations for an Advanced Static Var Compensator (ASVC)" mentioned above, a two-point inverter may also be provided as the self-commutated inverter. Likewise, the five-point inverter presented in the above-mentioned article "A High-Voltage Large-Capacity Dynamic Var Compensator Using Multilevel Voltage Source Inverter" or a multilevel inverter in general can be used as the self-commutated inverter. Since the design and functioning of the self-commutated inverter of an ASVC or an SVG are described in detail in the above-mentioned publications, they will not be discussed in detail here.

The device 6 consists of at least one cascade 8 per phase R or S or T and can be connected between the self-commutated inverter 2 and a transformer of a reactive-power compensation device. Each cascade 8 consists of a capacitive storage device 10 and a switching device 12. The capacitive storage device 10 of a cascade can be connected by means of this switching device 12 in the proper phase R, S, or T or out of phase, as desired. The device 6 illustrated in FIG. 1 has n cascades 8 per phase R, S or T. The self-commutated inverter 2 shown here is designed as a three-point inverter. Likewise, the switching device 12 is also a three-step design, and the design of the capacitive storage device 10 of cascade 8 corresponds to the design of the capacitive storage device 4 of the self-commutated inverter 2. In the embodiment shown here, the capacitive storage device 4 or 10 consists of a series circuit of two capacitors, each of which is charged to half the d.c. link voltage $U_{dc}$.

With the device according to the present invention, n additional capacitive storage devices 10 can be connected in the current path of any phase R, S or T of the reactive-power compensation device, so the line-midpoint voltage $U_{SRR}$ depicted in FIG. 2 of the self-commutated inverter 2 is increased incrementally. In FIG. 3, the line-midpoint voltage $U_{SRR1}$ is shown plotted as a function of one period. This line-midpoint voltage $U_{SRR1}$ is composed of the line-midpoint voltage $U_{SRR0}$ of the inverter 2 and a component that is obtained from the voltage $U_{dc}/2$ of the first capacitor of the capacitive storage device 10 by appropriate switching of the switching device 12 of the first cascade 8. The height of these voltage levels depends on the charging voltage of the capacitive storage devices 4 and 10 of the inverter 2 and the cascade 8 of device 6.

The angle range ε (angle range for the zero potential) corresponds to the angle range β of the article, "A Comparison of Different Circuit Configurations for an Advanced Static Var Compensator (ASVC)" cited above. On page 523 of that article, the angle range β is given as π/12, so the 5th and 7th harmonics are minimal. Through an appropriate choice of the angles $\epsilon_0, \epsilon_1, \ldots \epsilon_n$ the production of higher harmonics can be minimized. In the plot of the line-midpoint voltage $U_{SRR}$ shown in FIG. 3, the angles are $\epsilon_0=\pi/24$ and $\epsilon_1=3\cdot\pi/24$.

Because device 6 of the present invention is connected on the line side with at least one cascade 8 per phase R, S, T (FIG. 1), the fundamental mode of any line-midpoint voltage of the self-commutated inverter 2 in three-phase circuit with the device 6 approaches a sinusoidal form, where this approximation is improved with an increase in the number of cascades 8 of the device. Thus, without using any other inverters 2, a higher fundamental yield of the inverter 2 is achieved. Due to this increase in the fundamental yield, the inverter 2 realizes a higher total power, a higher power per switching element of inverter 2, and a reduction in higher harmonics.

Figure 4:
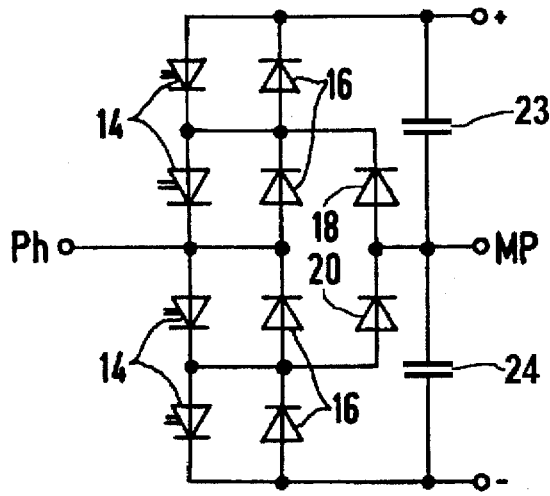
FIG. 4 shows the implementation of a switching element of the device according to FIG. 1 as a three-point module.

As already mentioned, the embodiment according to FIG. 1 shows the switching device 12 of each cascade 8 as a three-point device. Likewise, the self-commutated inverter 2 is a three-point inverter. The three-point switching device 12 may be a three-point module, such as the embodiment illustrated in FIG. 4. This three-point module consists of a bridge leg with four switched power semiconductor switches 14, such as gate turn-off thyristors (GTOs) with the respective free-wheeling diodes 16 that form a three-point valve leg with the help of two neutral point diodes 18 and 20. A capacitor 23 is connected between the terminals ⊕ and MP, and another capacitor 24 is connected between the terminals MP and ⊖. The phase R or S or T is connected to the terminals Ph and MP. The design of such a three-point valve leg is identical to a bridge leg of a three-point inverter. By controlling the switched power semiconductor switches 14, one of the two capacitors can be switched into the current path of a phase, establishing a line-midpoint voltage $U_{SRR}$ as shown in FIG. 3.

Figure 5:
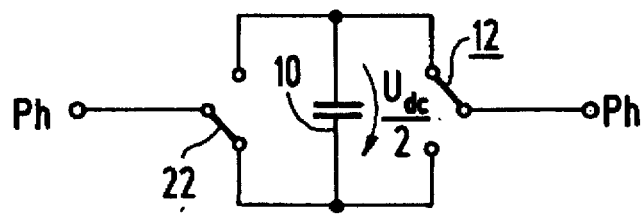
FIG. 5 shows an advantageous design of a cascade of the device according to FIG. 1.
Figure 6:
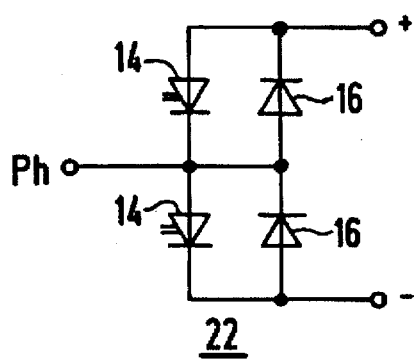
FIG. 6 shows the implementation of a switching device according to FIG. 5 as a two-point module.

FIG. 5 shows an advantageous embodiment of a cascade 8 of a device 6 according to FIG. 1. This advantageous cascade 8 consists of a capacitive storage device 10 and a switching device 12, which has two two-point modules 22. Implementation of this two-point module 22 is illustrated in detail in FIG. 6. This two-point valve leg consists of two switched power semiconductors 14 with respective free-wheeling diodes 16. The design of such a two-point valve leg is identical to a bridge leg of a two-point inverter. By means of the two two-point modules 22, the capacitive storage device 10 can be switched into phase or out of phase as desired. In addition, only one capacitor is needed to serve as the capacitive storage device 10.

Figures 7, 8:
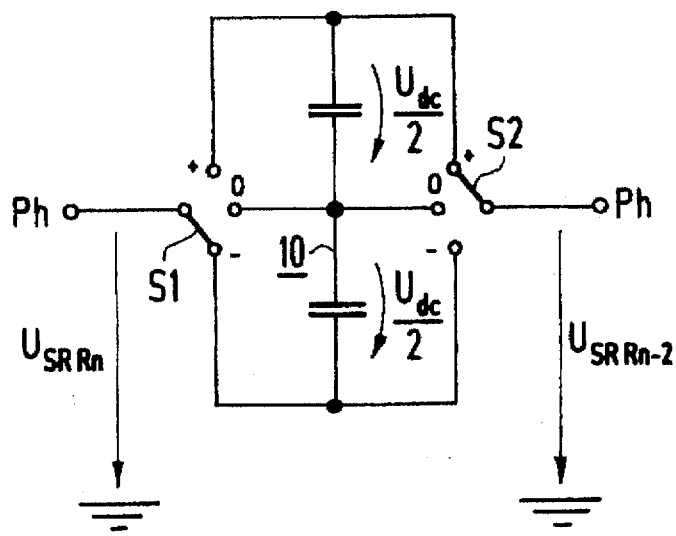
FIG. 7 shows the combination of two cascades of one phase of the device according to this invention.
FIG. 8 shows a possible sequence of switch states in the form of a table 5

FIG. 7 shows a basic unit consisting of two cascades 8 of one phase. Combining two cascades 8 into one basic unit makes it possible to eliminate one capacitive storage device 10 for cascade 8. FIG. 8 shows an example of a possible sequence of switch states in a table.

Figure 9:
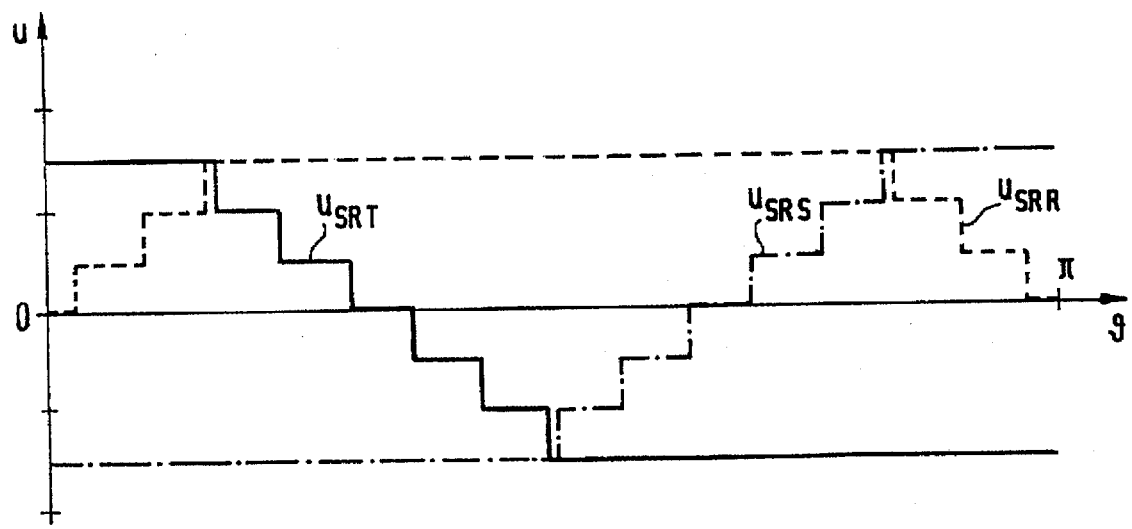
FIG. 9 shows the three line-midpoint voltages of a three-point inverter with a device according to this invention, plotted in a diagram as a function of the angle θ.
Figure 10:
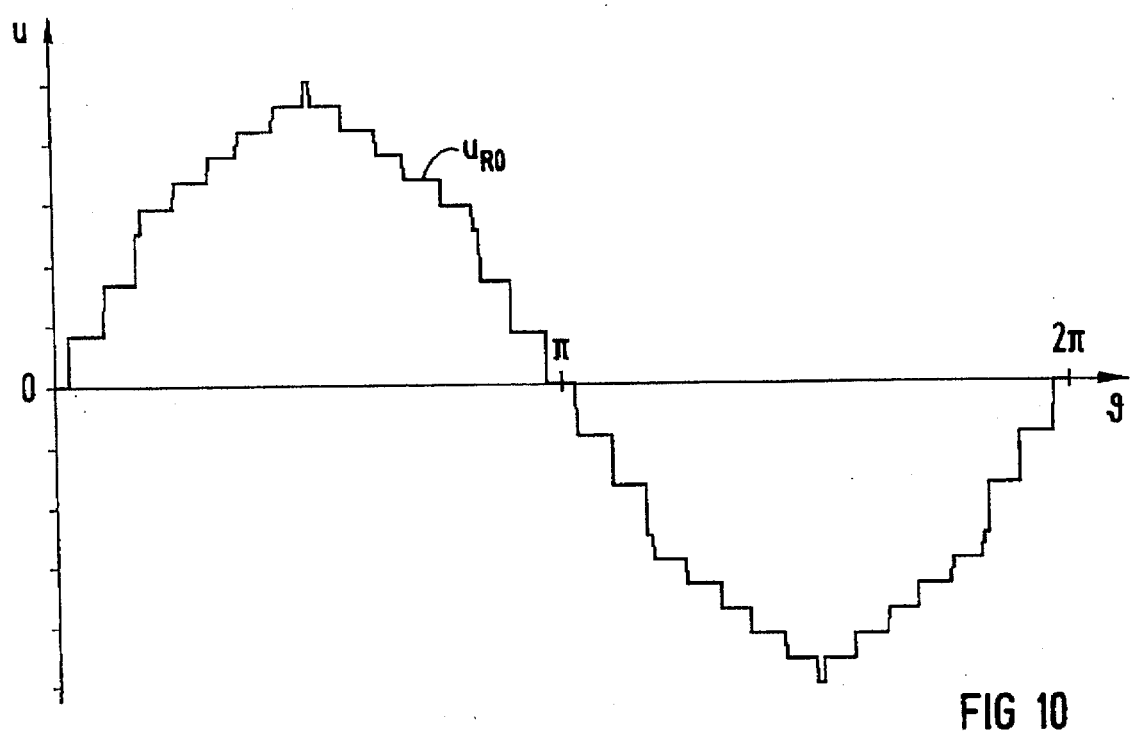
FIG. 10 shows a diagram of the line-star point voltage of an inverter with the device according to this invention.
Figure 12:
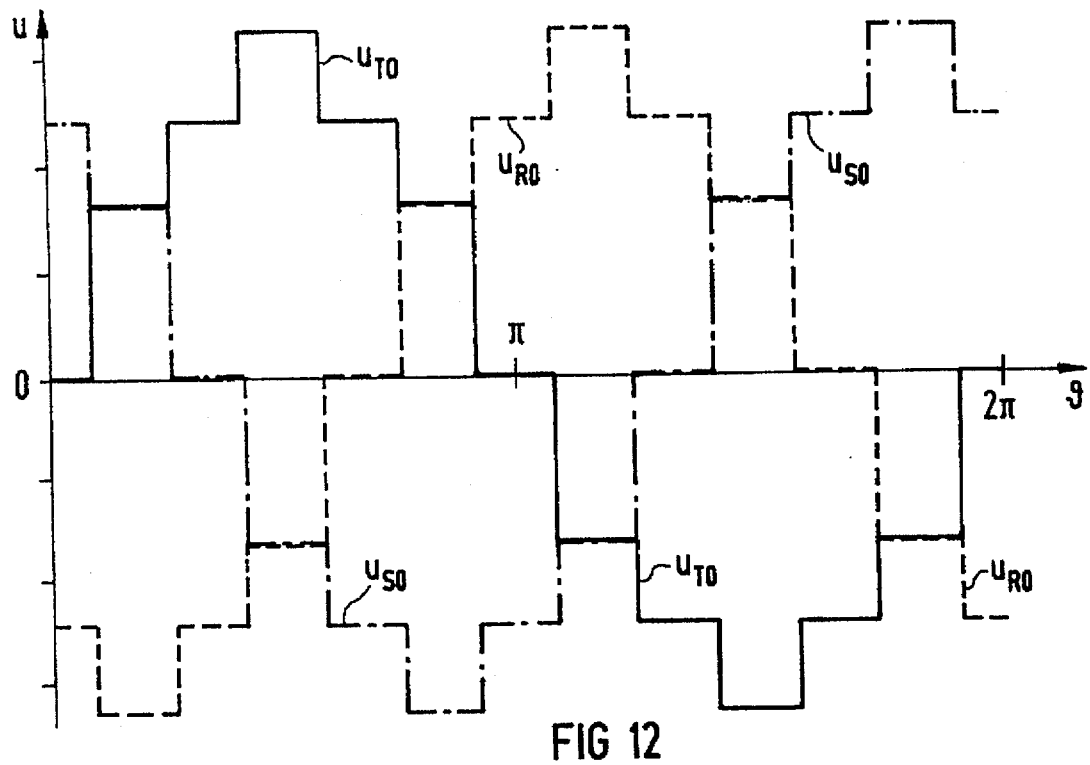
FIG. 12 shows a diagram of the three line-star point voltages of a known three-point inverter in three-phase circuit.
Figure 11:
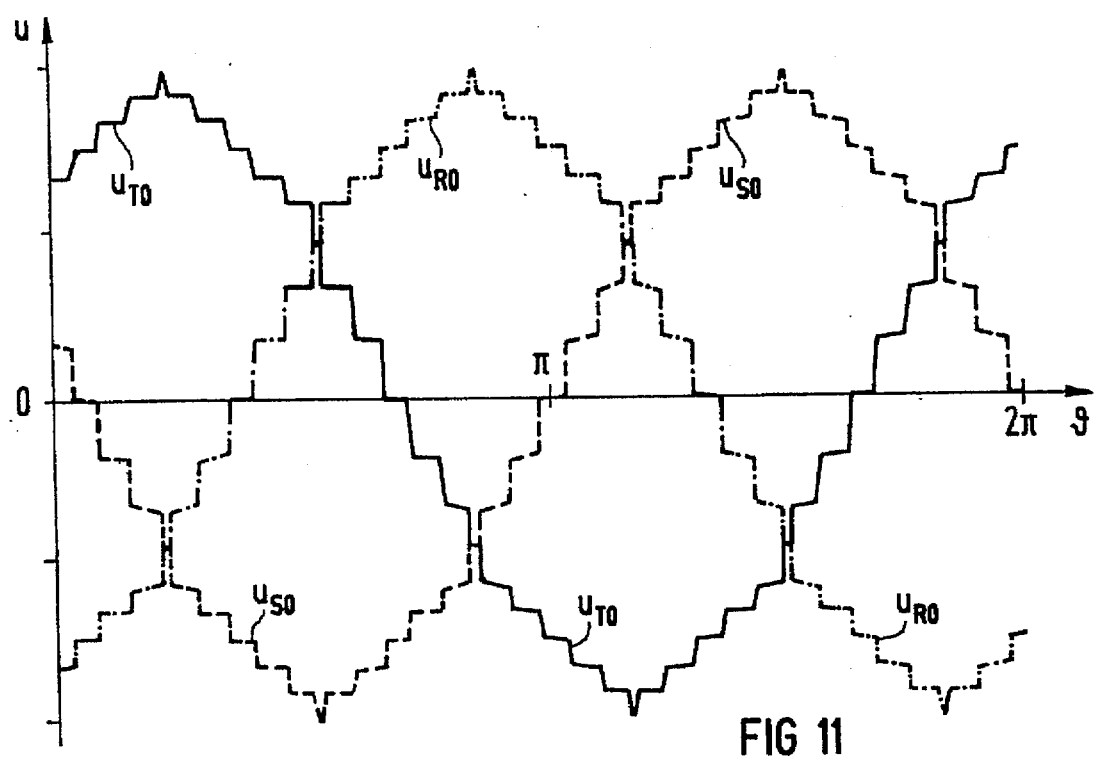
FIG. 11 shows a diagram of the three line-star point voltages of an inverter in three-phase circuit with the device according to this invention.

When using a device 6 with two cascades 8 according to FIG. 7 per phase in combination with a three-point inverter, one obtains the three line-midpoint voltages $U_{SRR}$, $U_{SRS}$ and $U_{SRT}$ whose curves over half a period are plotted as a function of the angle 29 in a diagram in FIG. 9. FIG. 10 shows the plot of a line-star point displacement voltage $U_{RO}$ (voltage over the reactance of the transformer against the neutral point of the transformer), and FIG. 11 shows the plots of the three line-star point voltages $U_{RO}$, $U_{SO}$ and $U_{TO}$. The voltage $U_{RO}$ is composed of the three line-midpoint voltages $U_{SRR}$, $U_{SRS}$, and $U_{SRT}$. These voltage curves are approximately sinusoidal. This means that a considerable increase in fundamental yield is achieved by means of this device 6 which has two cascades 8 per phase. By comparison, FIG. 12 shows the curves of the line-star point voltages $U_{RO}$, $U_{SO}$ and $U_{TO}$ of a traditional three-point inverter. The substantial deviation from a sinusoidal shape for the three-point inverter (FIG. 12) compared with the approximately sinusoidal shape of the voltage curves of the present invention (FIG. 11) demonstrate that the present invention has a significantly higher fundamental yield than that of the known three-point inverter.

What is claimed is:

1. A device for increasing the fundamental power yield of a self commutated inverter having a plurality of capacitive storage devices in a multiplex network said device comprising:
   a single phase cascade for each phase of the multi-phase configuration wherein each single phase cascade includes,
   i. a capacitive storage device;
   ii. a switching device for selectively switching the capacitive storage device into phase and out of phase with respect to the phase with which that cascade is associated.

2. The device of claim 1, wherein said switching device comprises two two-point modules.

3. The device of claim 1, wherein said switching device comprises a three-point module.

4. The device of claim 1, wherein said capacitive storage device comprises a capacitor.

5. The device of claim 1, wherein said capacitive storage device comprises two capacitors of the same size.

6. The device of claim 1 wherein said capacitive storage device includes one capacitor and said switching device includes two two-point modules, each of said two-point modules electrically connected in parallel with said capacitor.

7. The device of claim 2 wherein said capacitive storage device includes one capacitor and said switching device includes two two-point modules, each of said two-point modules are electrically connected in parallel with said capacitor.

8. The device of claim 4 wherein said capacitive storage device includes one capacitor and said switching device includes two two-point modules, each of said two-point modules electrically connected in parallel with said capacitor.

9. The device of claim 1, wherein said switching device includes one three-point module and said capacitive storage devices includes two capacitors of the same size which are electrically connected in series, said capacitive storage devices and three-point module being electrically connected.

10. The device of claim 3, wherein said switching device includes one three-point module and said capacitive storage device includes two capacitors of the same size which are electrically connected in series, said capacitive storage devices and three-point module being electrically connected.

11. The device of claim 5 wherein said capacitive storage device includes one three-point module and said capacitive storage device includes two capacitors of the same size which are electrically connected in series, said capacitive storage devices and three-point module being electrically connected.

12. The device of claim 1, wherein two of said single-phase cascades of the same phase are combined into one structural unit.

13. The device of claim 1, said capacitive storage device including two capacitors of the same size electrically connected in series and said switching device including two three-point modules electrically connected in parallel with said capacitors connected in series.

14. The device of claim 3, said capacitive storage device including two capacitors of the same size electrically connected in series and said switching device further includes a second three-point module wherein the two three-point modules are electrically connected in parallel with said capacitors being connected in series.

15. The device of claim 5, said two capacitors are electrically connected in series and said switching device including two three-point modules electrically connected in parallel with said capacitors.

16. The device of claim 12, said capacitive storage device including two capacitors of the same size electrically connected in series and said switching device including two three-point modules electrically connected in parallel with said capacitors.

17. The device of claim 2, wherein said two-point module is a bridge valve leg including two switched power semiconductor switches with respective free-wheeling diodes.

18. The device of claim 3, wherein said three-point module is a bridge valve leg including four switched power semiconductor switches, four free-wheeling diodes each of which is electrically connected in parallel to one of said switched power semiconductor switches, and two series-connected midpoint diodes connected in parallel to said free-wheeling diodes.

* * * * *